(12) United States Patent
Nagata (10) Patent No.: US 9,327,357 B2
(45) Date of Patent: May 3, 2016

(54) GEAR MACHINING APPARATUS, CUTTER AND STRAIN WAVE GEARING DEVICE

(75) Inventor: Eiri Nagata, Toyoake (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 787 days.

(21) Appl. No.: 13/218,931

(22) Filed: Aug. 26, 2011

(65) Prior Publication Data
US 2012/0057944 A1 Mar. 8, 2012

(30) Foreign Application Priority Data

Aug. 31, 2010 (JP) .................................. 2010-194213

(51) Int. Cl.
| | |
|---|---|
| *B23F 5/12* | (2006.01) |
| *B23F 5/16* | (2006.01) |
| *B23F 15/00* | (2006.01) |
| *F16H 55/08* | (2006.01) |

(52) U.S. Cl.
CPC ................ *B23F 5/163* (2013.01); *B23F 15/00* (2013.01); *F16H 55/0833* (2013.01); *Y10T 409/107473* (2015.01)

(58) Field of Classification Search
CPC .......... B23F 21/28; B23F 21/12; B23F 21/22; B23F 5/20; B23F 5/26; B23F 5/27
USPC ........... 407/27, 28, 29; 409/31, 33, 34, 35, 42
See application file for complete search history.

(56) References Cited

U.S. PATENT DOCUMENTS

| | | | | |
|---|---|---|---|---|
| 1,221,613 A | * | 4/1917 | Simmons ................ | B23F 21/14 407/29 |
| 2,202,407 A | * | 5/1940 | Sykes ..................... | B23F 21/10 407/28 |

(Continued)

FOREIGN PATENT DOCUMENTS

| | | |
|---|---|---|
| AT | 59866 B | 6/1913 |
| AT | 144253 B | 1/1936 |

(Continued)

OTHER PUBLICATIONS

Information Statement issued Jan. 21, 2014 in Japanese Patent Application No. 2010-194213 with English language translation.

(Continued)

*Primary Examiner* — Sunil K Singh
*Assistant Examiner* — Alan Snyder
(74) *Attorney, Agent, or Firm* — Oblon, McClelland, Maier & Neustadt, L.L.P.

(57) ABSTRACT

A gear machining apparatus includes a skiving mechanism positioning a work to be machined and a pinion type cutter on axes skewing from each other, the skiving mechanism rotating the work at a predetermined position and feeding the cutter while rotating in a direction of a tooth trace of a gear to be formed at the work synchronously to the rotation of the work for producing the gear from the work. The cutter includes a tooth surface which is formed with an involute region having an involute curve in an area including a pitch circle in a tooth depth direction, an addendum region continuously formed from the involute region to an addendum, and a dedendum region continuously formed from the involute region to a dedendum the addendum region and the dedendum region being shaped in a configuration different from the involute region.

5 Claims, 3 Drawing Sheets

(56) References Cited

U.S. PATENT DOCUMENTS

| | | | |
|---|---|---|---|
| 2,308,891 A | | 1/1943 | Miller |
| 2,354,670 A | * | 8/1944 | Drummond ............... 409/31 |
| 2,392,803 A | * | 1/1946 | Austin ..................... 409/33 |
| 3,180,227 A | * | 4/1965 | Schlichthorlein ......... 409/31 |
| 4,066,001 A | | 1/1978 | Nishijima et al. |
| 4,663,813 A | | 5/1987 | Carlson |
| 4,823,638 A | | 4/1989 | Ishikawa |
| 4,825,715 A | * | 5/1989 | Buczek et al. ............ 74/462 |
| 4,865,497 A | | 9/1989 | Faulstich |
| 7,103,973 B2 | * | 9/2006 | Wolff et al. ........... 29/893.35 |
| 2006/0058151 A1 | * | 3/2006 | Flair et al. ............... 475/331 |

FOREIGN PATENT DOCUMENTS

| | | |
|---|---|---|
| CH | 124186 A | 1/1928 |
| DE | 243514 C | 2/1912 |
| DE | 423518 C | 1/1926 |
| DE | 471 121 C | 2/1929 |
| DE | 512 450 C | 11/1930 |
| DE | 608 877 C | 2/1935 |
| DE | 1 070 901 B | 12/1959 |
| DE | 1 135 259 B | 8/1962 |
| DE | 195 09 448 A1 | 11/1995 |
| DE | 195 01 016 A1 | 7/1996 |
| DE | 197 35 052 A1 | 3/1998 |
| DE | 296 22 185 U1 | 9/1998 |
| DE | 100 57 594 A1 | 5/2001 |
| DE | 101 61 941 A1 | 7/2003 |
| DE | 102 96 591 T5 | 4/2004 |
| DE | 10 2005 049 528 A1 | 5/2007 |
| DE | 10 2007 015 357 A1 | 10/2008 |
| DE | 10 2008 037 514 A1 | 5/2010 |
| EP | 1 504 838 A1 | 2/2005 |
| GB | 601758 A | 5/1948 |
| JP | 61-226220 | 10/1986 |
| JP | 62-68220 A | 3/1987 |
| JP | 01-159126 A | 6/1989 |
| JP | 3-60920 A | 3/1991 |
| JP | 07-032215 A | 2/1995 |
| JP | 7-84896 | 9/1995 |
| JP | 2005-66815 A | 3/2005 |
| WO | WO 2010/102992 A1 | 9/2010 |

OTHER PUBLICATIONS

Design and manufacture of gears (1), Full Dental Design and Production Car, May 25, 1971, 1 page with English translation.
Darle W. Dudley, Editor, The Design, Manufacture, and Application of Gears, Gear Handbook, 1962, pp. 1-11.
Office Action issued Mar. 20, 2014 in Japanese Patent Application No. 2010-194213 (with English language translation).
Komio Nishijima et al., "Gear Skiving of Involute Internal Spur Gear: Part 2, on the Practical Problems", Transactions of the Japan Society of Mechanical Engineers, vol. 40(329), 1974, 7 Pages.
Masakazu Kojima et al., "Gear Skiving of involute internal Spur Gear. Part 1, On the Tooth Profile", Transactions of the Japan Society of Mechanical Engineers, vol. 39(324),1973. pp. 2580-2586.
The Extended European Search Report issued Jun. 29, 2012, in Application No. / Patent No. 11177953.4-1254 / 2422920.
Masakazu Kojima, et al., "Gear Skiving of Involute Internal Spur Gear", (Part 1, On the Tooth Profile), Bulletin of the JSME, vol. 17, No. 106, Apr. 1974, pp. 511-518.
Communication of a notice of opposition issued May 15, 2014 in European Patent Application No. 11177953.4 (with English language translation).
Communication of a notice of opposition issued May 15, 2014 in European Patent Application No. 11177953.4.
Prof. Dr.-Ing. Andreas Ettemeyer, et al., "Konstruktionselemente", Kapitel 14: Getriebe, Fachhochschule München Fachbereich 06—Feinwerk- und Mikrotechnik, Version 3.02, 2007, 27 Pages with cover page.
"Verzahnungstechnik", Lorenz GmbH & Co., G. Braunsche Hofbuchdruckerei und Verlag, Karlsruhe, 1977, 9 Pages.
"Verzahnwerkzeuge", Lorenz GmbH & Co., Badenia Verlag + Druckerei AG, Karlsruhe, 1961, 5 Pages with cover page.
"Verzahnwerkzeuge", Lorenz GmbH & Co., Handbuch für Konstruktion und Betrieb, 1977, 7 Pages with cover page.
Prof. Dr.-Ing. Dr.-Ing. E.h. Gustav Niemann, et al., "Maschinenelemente Band 3", zweite Auflage, Springer, 1986, 6 Pages with cover page.
"Convolute prior public use of cutting tool", Caterpillar Inc., Gleason Cutting Tools Corporation, ID-55396-009-2-04, 2006, 8 Pages.
Office Action issued Oct. 16, 2014, in Japanese Patent Application No. 2010-194213 with English translation.

* cited by examiner

GEAR MACHINING APPARATUS, CUTTER AND STRAIN WAVE GEARING DEVICE

CROSS REFERENCE TO RELATED APPLICATIONS

This application is based on and claims priority under 35 U.S.C. §119 to Japanese Patent Application 2010-194213, filed on Aug. 31, 2010, the entire content of which is incorporated herein by reference.

TECHNICAL FIELD

This disclosure generally relates to a gear machining apparatus, a cutter, and a strain wave gearing device.

BACKGROUND DISCUSSION

A known gear machining apparatus, which machines an internal spur gear by skiving, is disclosed in the following reference: KOJIMA Masakazu, and NISHIJIMA Komio. "Gear Skiving of Involute Internal Spur Gear: Part 1, On the Tooth Profile" Transactions of the Japan Society of Mechanical Engineers 39(324), 2580-2586, (hereinafter referred to as non-patent reference 1). The non-patent reference 1 discloses that a tooth profile is defined by defining factors, for example, a rake angle of specifications for a cutter, a cutting angle, a rake face re-cutting amount, and a tooth number ratio.

A skiving method for attaining high cutting efficiency when machining an internal spur gear, and modifications of tooth profile of a cutter is disclosed in the following reference: NISHIJIMA Komio, KOJIMA Masakazu, and YAMADA Toyo "Gear Skiving of Involute Internal Spur Gear: Part 2, On the Practical Problems" Transactions of the Japan Society of Mechanical Engineers 40(329), 260-268, (hereinafter referred to as non-patent reference 2).

JPH07-84896B (hereinafter refereed to as patent reference 1) discloses a flexible meshing type gear device as a gear device applied with the internal gear. The flexible meshing type gear device includes a rigid circular internal gear, a flexible external gear arranged inside the internal gear, and a wave generator flexibly deforming and rotating the external gear in the deformed configuration.

The gear device disclosed in the patent reference 1 is named as a strain wave gearing device in which the number of teeth of the external gear is defined to be less than the number of teeth of the internal gear, and only two teeth corresponding to positions of portions of an elliptic longitudinal shaft of a cam plate of the external gear engage with the teeth of the internal gear by the deformation of the external gear by the cam plate. By rotating the cam plate with the foregoing constructions, engaging points are moved while elastically deforming the external gear in response to the movement of the elliptic longitudinal shaft to obtain a greater reduction ratio on the basis of a difference of the teeth numbers between the internal gear and the external gear.

As described in the patent reference 1, because the strain wave gearing device is configured to move a region to flex in response to the rotation of the cam plate by engaging a portion of the external gear to the internal gear by flexing the external gear by the cam plate, the external gear and the internal gear are required to be formed with high precision.

Regarding the internal gear, a gear shaper may be applied to machine the internal gear with high precision. However, although the machining is achieved with high precision with the gear shaper, the machining time with the gear shaper is long thus increasing manufacturing costs of the strain wave gearing device.

Alternatively, a skiving may be applied for machining the internal gear. The skiving is favorable for reducing the machining time of the internal gear because of high cutting efficiency. Notwithstanding, it has been considered that the machining with high precision is unlikely to be obtained by skiving.

Reasons that the machining with high precision is unlikely obtained by the skiving are that many parameters (factors) are required to be defined when machining, degrees of variations of machining precision (tooth profile error) are great in accordance with the dispersions of the parameters, and the tooth profile error is sensitively reflected onto the machining precisions. As described in the non-patent reference 1 and the non-patent reference 2, for example, a crossed axes angle of an axis of an object to be machined (a work) and an axis of the cutter, a distance between the axes, and a value of radius of a base circuit of the cutter, are included as the parameters defined when machining. By setting the multiple parameters appropriately, the high machining precisions can be obtained.

According to the skiving, dispersions of the machining precisions are caused by variations of tooth profile of a machined work gear by, for example, errors in cutter production, setting errors of machining machine, and when putting an edge on the cutter, which are necessary for normal production activities. The references disclose that the errors in the tooth profile cause a tendency similar to the case where the radius of the base circle of the cutter is varied.

A need thus exists for a gear machining apparatus, a cutter and a strain wave gearing device which is not susceptible to the drawback mentioned above.

SUMMARY

In light of the foregoing, the disclosure provides a gear machining apparatus, which includes a skiving mechanism positioning a work to be machined and a pinion type cutter on axes skewing from each other, the skiving mechanism rotating the work at a predetermined position and feeding the cutter while rotating in a direction of a tooth trace of a gear to be formed at the work synchronously to the rotation of the work for producing the gear from the work. The cutter includes a tooth surface which is formed with an involute region having an involute curve in an area including a pitch circle in a tooth depth direction, an addendum region continuously formed from the involute region to an addendum, and a dedendum region continuously formed from the involute region to a dedendum, the addendum region and the dedendum region being shaped in a configuration different from the involute region.

According to an aspect of this disclosure, a cutter applied to a gear machining apparatus includes a skiving mechanism positioning a work to be machined and the pinion type cutter on axes skewing from each other, the skiving mechanism rotating the work at a predetermined position and feeding the cutter while rotating in a direction of a tooth trace of a gear to be formed at the work synchronously to the rotation of the work for producing the gear from the work. The cutter includes a tooth surface which is formed with an involute region having an involute curve in an area including a pitch circle in a tooth depth direction, an addendum region continuously formed from the involute region to an addendum, and a dedendum region continuously formed from the involute region to a dedendum, the addendum region and the dedendum region being shaped in a configuration different from the involute region. In a case where a tooth number of a gear to be formed on the work is defined as Zw and a tooth number of the cutter is defined as Zc, a ratio Zc/Zw between the cutter tooth number Zc and the work tooth number Zw is set within a range of being greater than ¼ and being smaller than ⅔ when the gear to be formed on the work is an internal gear and a ratio Zc/Zw between the cutter tooth number Zc and the work tooth number Zw is set within a range of being greater than ½ and being smaller than 3 when the gear to be formed on the work is an external gear.

According to another aspect of this disclosure, a strain wave gearing apparatus includes an internal gear and an external gear having a reduced number of teeth compared to the internal gear, the external gear being flexible. The internal gear is produced by a gear machining apparatus including a skiving mechanism positioning a work to be machined and a pinion type cutter on axes skewing from each other, the skiving mechanism rotating the work at a predetermined position and feeding the cutter while rotating in a direction of a tooth trace of a gear to be formed at the work synchronously to the rotation of the work for producing the gear from the work, and the cutter including a tooth surface which is formed with an involute region having an involute curve in an area including a pitch circle in a tooth depth direction, an addendum region continuously formed from the involute region to an addendum, and a dedendum region continuously formed from the involute region to a dedendum, the addendum region and the dedendum region being shaped in a configuration different from the involute region. A part of teeth of the internal gear is engaged with a part of teeth of the external gear by flexing the external gear, and the internal gear and the external gear relatively rotate by rotating a flexed portion of the external gear.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of a gear machining apparatus, a cutter and a strain wave gearing device will be explained with reference to illustrations of drawing figures as follows.

Figure 1:
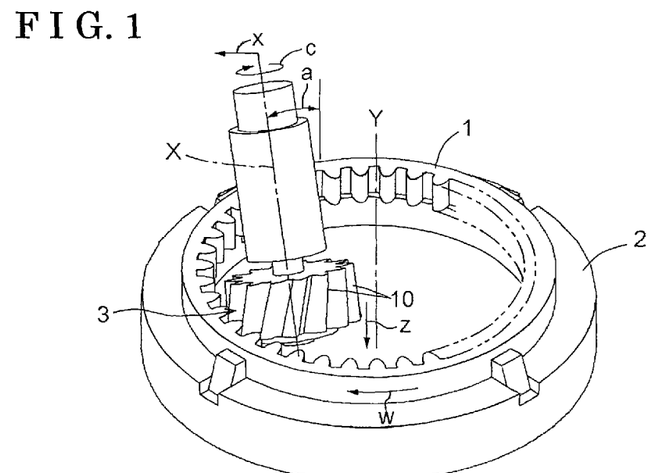
FIG. 1 is a perspective view showing a machining process by a gear machining apparatus according to a first embodiment disclosed here.
Figure 2:
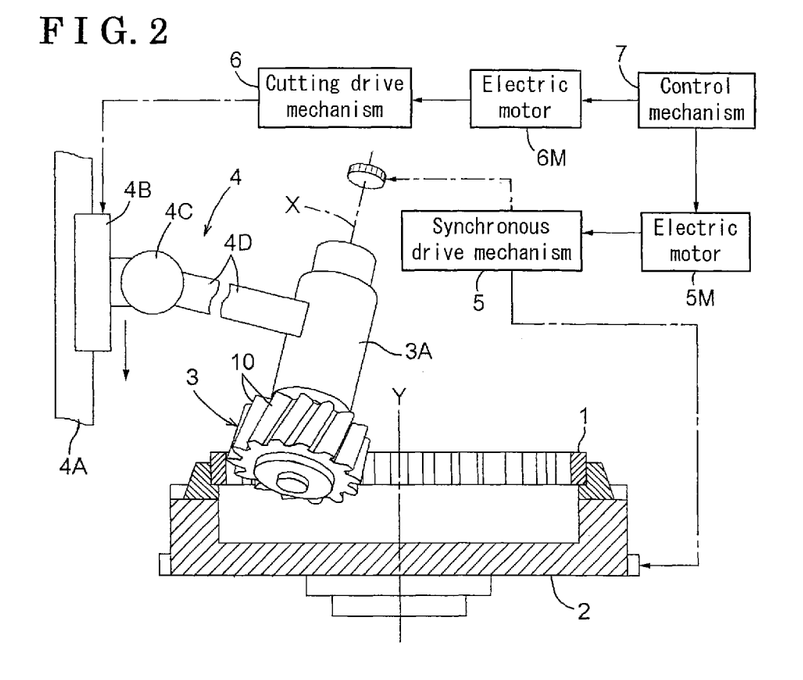
FIG. 2 is a block diagram showing a structure of a gear machining mechanism.

As illustrated in FIGS. 1 and 2, the gear machining apparatus disclosed here includes a table 2 supporting a work 1 which is an object to be machined and is rotatable about a vertical axis Y, a pinion type cutter 3 rotatably supported about a machining axis X, and an operation portion 4 rotatably supporting the cutter 3 and movable in directions of tooth trace of a gear to be formed at the work 1. A skiving processing mechanism is structured with the table 2, the cutter 3, and the operation portion 4. The gear machining apparatus includes a synchronous drive mechanism 5 synchronously rotating the table 2 and the cutter 3, a cutting drive mechanism 6 moving the operation portion 4 in the directions of a tooth trace of the gear to be formed at the work 1, and a control mechanism 7 for controlling an electric motor 5M transmitting a drive force to the synchronous drive mechanism 5 and an electric motor 6M transmitting a drive force to the cutting drive mechanism 6.

An angle of the machining axis X with reference to the vertical axis Y is defined as an inclination angle a, a rotational amount per unit time of the cutter 3 is defined as a cutter rotational amount c, a depth of cut (an engaging amount) of the work 1 by the cutter 3 is defined as a cutting amount x, a moving amount (a distance) of the cutter 3 in a direction of the vertical axis Y is defined as a cutter feed amount z, and a rotational amount per unit time of the work 1 (the work gear) is defined as a work rotational amount w. The inclination angle a, the cutter rotational amount c, the cutting amount x, the cutter feed amount z, and the work rotational amount w are part of parameters defined when machining a gear by the gear machining apparatus.

The synchronous drive mechanism 5 is configured to be actuated by the single electric motor 5M and includes plural gears and shafts which cooperatively rotate so that the work rotational amount w of the work 1 and the cutter rotational amount c of the cutter 3 establish a predetermined relationship. Alternatively, the synchronous drive mechanism 5 may include two synchronous type electric motors for independently actuating the table 2 and the cutter 3, the control mechanism 7 may output a synchronous signal to two electric motors.

The operational portion 4 includes a slider 4B movable along a guide body 4A to move the cutter 3 by the desired cutter feed amount z, and an arm 40 connecting to the slider 4B via a joint 4C allowing an angle of the arm 4D relative to the slider 4B to be adjustable so that the cutting amount x is determined as desired. An end of the arm 4D is connected to a frame portion 3A which rotatably supports the cutter 3, thus a drive force of the cutting drive mechanism 6 is transmitted to the slider 4B.

Settings of an angle of the guide body 4A and settings of an angle (the inclination angle a) of the machining axis X by the joint 4C of the operational portion 4 is manually defined and fixed, however, the angle of the guide body 4A and the angle (the inclination angle a) of the machining axis X may be adjusted by an electric motor. Constructions of the operational portion 4 are not limited to the construction shown in the drawings, and, for example, the inclination angle a may be determined by plural joints likewise a robot arm with multiple joints and the cutter 3 may be moved by the cutter feed amount z in the direction of the tooth trace of the gear to be formed on the work 1 by an operation of the robot arm.

The control mechanism 7 is configured to perform a calculating transaction and a controlling transaction following a predetermined program set in, for example, a micro-processor. The control mechanism 7 is configured to control the electric motors 5M, 6M.

The gear machining apparatus is named as a skiving apparatus. Drawings show a machining process for manufacturing an internal gear 21 (work gear) by cutting the work 1 by the cutter 3. According to this machining process, the vertical axis Y is set to be arranged in a vertical direction and the machining axis X is set in a predetermined inclined attitude. Then, the work 1 is rotated by the synchronous drive mechanism 5 at a fixed position together with the table 2 about the vertical axis Y, and synchronous to the rotation of the work 1 about the vertical axis Y the cutter 3 is rotated about the machining axis X. Thereafter, by the movement of the cutter 3 in the direction of the tooth trace of the gear to be formed on the work 1 by means of the cutting drive mechanism 6 in response to the rotation of the cutter 3, the internal gear 21 is machined. The internal gear 21 machined by the gear machining apparatus is applied to a strain wave gearing device (see FIG. 5) explained hereinafter.

[Tooth profile of cutter] According to the gear machining apparatus, when machining the gear with high precision, not only the setting of the angle of the machining axis X but also modifications, for example, a regrinding of the cutter 3 is necessary. However, the modifications of the cutter 3 is not easy and it is not practicable to provide multiple number of the cutters 3 having different tooth configurations (profiles), and thus according to the gear machining apparatus of the disclosure. the cutter 3 which does not require the extensive modifications when machining the internal gear is adopted.

Figure 3:
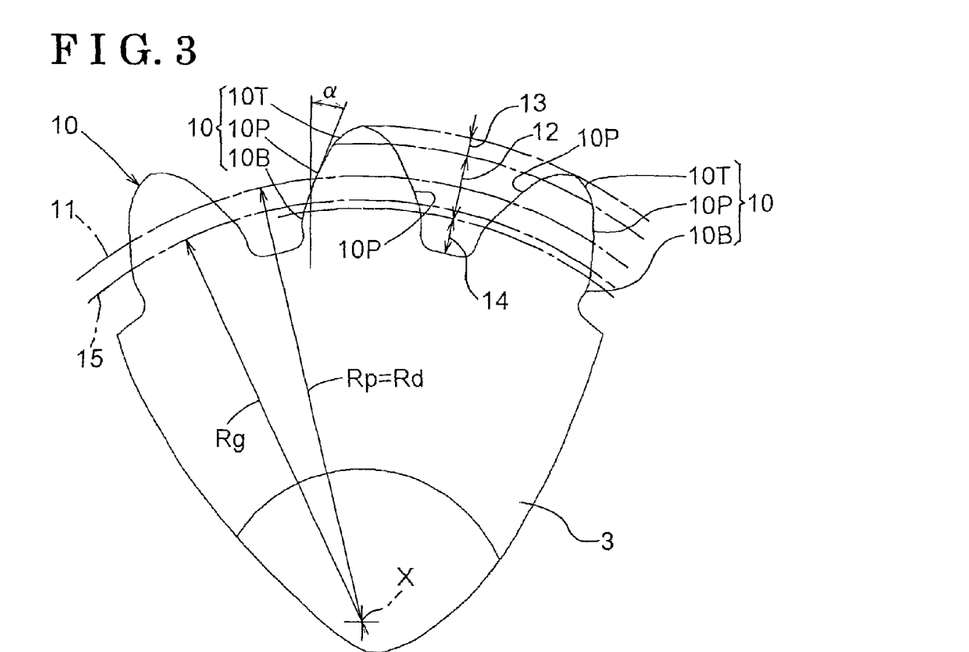
FIG. 3 is a view showing a tooth profile of a cutter according to the first embodiment disclosed here.

As illustrated in FIG. 3, an involute region 12 having an involute profile (surface) 10P which includes an involute curve at a portion of a tooth 10 of the cutter 3 at a position including a pitch circle 11. Further, the tooth 10 of the cutter 3 includes an addendum region 13 including an addendum surface 10T having a curved surface at an addendum side relative to the involute region 12 and a dedendum region 14 having a dedendum surface 10B having a curved surface at a dedendum side relative to the involute region 12. The addendum surface 10T and the dedendum surface 10B are formed continuously from the involute profile (surface) 10P, however, formed in different configurations from an involute curve.

According to the gear machining apparatus, a change in a base circle (i.e., one of parameters) of the cutter 3 defined as a gear may become necessary for the modifications of the cutter 3. This is because a difference of the base circles influence on an error in a machined tooth profile to a large extent, and according to the gear machining apparatus for performing a normal skiving process, a common cutter cannot be applied as the cutter 3 to works on which gears having different specifications to be formed, that is, to produce gears having different specifications. On the other hand, according to the gear machining apparatus of the disclosure, a common cutter can be applied to produce gears having a slight difference in the teeth number. For example, according to the gear machining apparatus of the disclosure, the common cutter can be applied when machining works to produce gears having a tooth number difference by two. Thus, productivity can be enhanced while reducing manufacturing costs. Because an involute curve for a tooth is calculated on the basis of a base circle 15 according to the cutter 3, a tooth surface configuration of different involute curves is determined every time a base circle radius Rg of the base circle 15 changes. In response to the foregoing inconveniences, according to the gear machining apparatus disclosed here defines a relationship between the base circle radius Rg and an average radius Rd of the involute region 12 as shown in formula 1 so that a change in the involute surface of a tooth surface is assumed to be relatively small even if the base circle radius Rg of the base circle is changed and the cutter 3 does not require modifications.

$$\text{<Average radius } Rd/\text{Base circle radius } Rg<1.1 \quad \text{[Formula 1]}$$

Namely, a value dividing the average radius Rd of the involute region 12 by the base circle radius Rg is defined to be greater than one (i.e., 1) and smaller than one point one (i.e., 1.1). In those circumstances, referring to FIG. 3, because the pitch circle 11 is positioned at a position at a half (½) position of the involute region 12, a pitch circle radius Rp of the pitch circle 11 and the average radius Rd accord to each other. Further, the involute region 12 is defined to occupy sixty to seventy percent (60% to 70%) of en entire tooth depth in the tooth depth direction. The involute region 12 may be defined to be equal to or more than ten percent (10%) of a tooth depth of the cutter 3 and to be less than eighty-five percent (85%) of the tooth depth of the cutter 3.

The following formula 2 is established for a relationship among a module m, a tooth number z, a pressure angle α and a base circle diameter Dg (=2 Rg) for a gear.

$$2Rg=Dg=z \cdot m \cdot \cos\alpha \quad \text{[Formula 2]}$$

Figure 5:
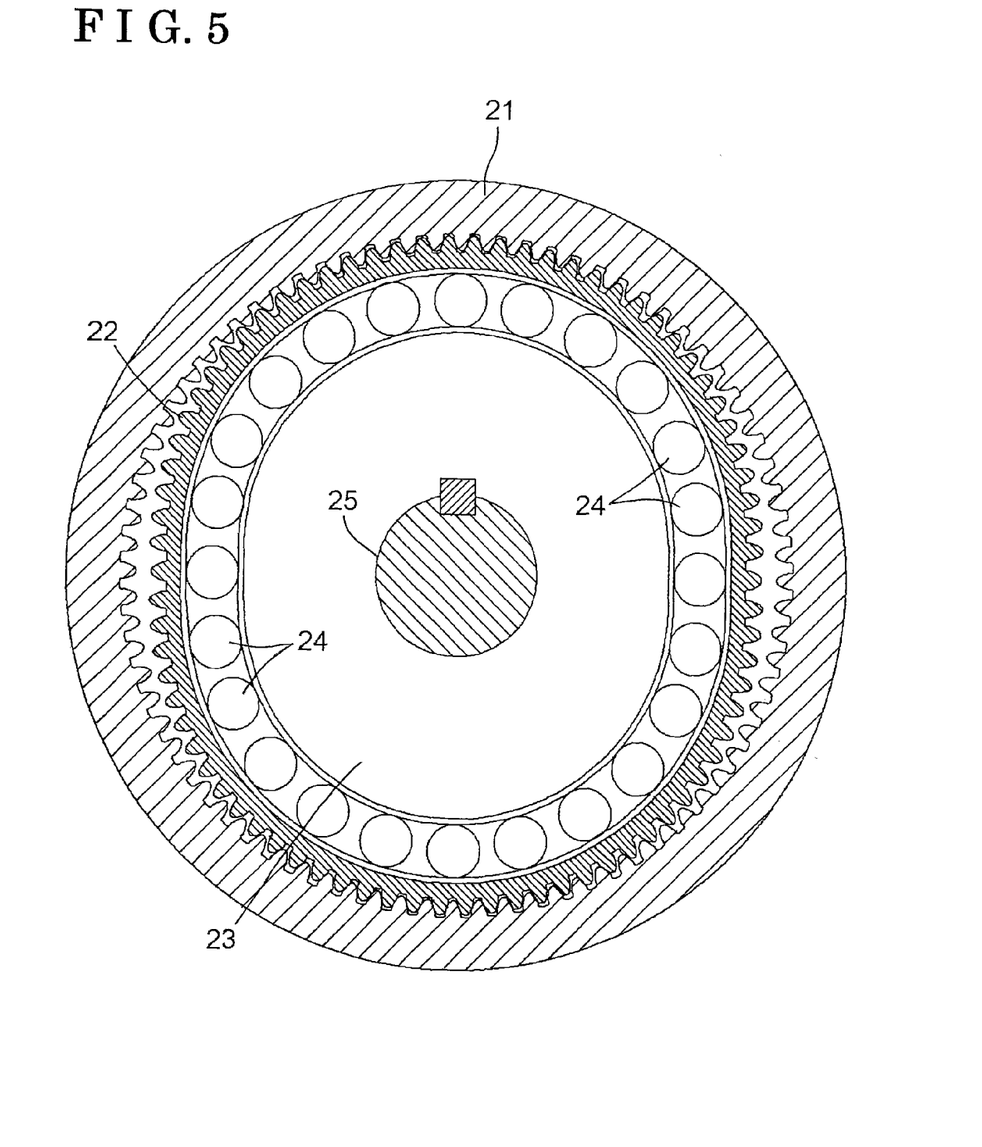
FIG. 5 is a cross-sectional view showing a structure of a strain wave gearing device according to the embodiments disclosed here.

Based on the formula 2, it is understood that, when the base circle radius Rg is adequately large, variations of the involute curve are assumed to be small in a case where a value of the base circle radius Rg is changed by a unit value for modifying a tooth profile of the cutter 3. Because the number of teeth for the internal gear 21 applied to the strain wave gearing device shown in FIG. 5 is significantly large, the number of teeth of the cutter 3 for machining the internal gear is increased. Thus, the number z of the teeth of the cutter 3 can be increased, thus increasing the base circle radius Rg. Further, the value of the base circle radius Rg is increased by increasing the value of the pressure angle α.

By machining the internal gear using the cutter 3 with the foregoing configurations, the involute surface 10P is formed in the involute region 12 of the cutter 3 and the involute surface 10P is formed within a region including a pitch circle in a tooth depth direction of the internal gear.

According to the cutter 3 disclosed here, under a condition that the work tooth number is defined as Zw and the tooth number of the cutter is defined as Zc, a ratio of the cutter tooth number Zc and the work tooth number Zw (i.e., Zc /Zw) is determined as follows.

First, in a case where a work gear is an internal gear (i.e., an internal gear is to be formed on a work), the ratio of the cutter tooth number Zc and the work tooth number Zw is set within a range as follows: ¼<Zc/Zw<⅔. Second, in a case where a work gear is an external gear (i.e., an external gear is to be formed on a work), the ratio of the cutter tooth number Zc and the work tooth number Zw is set within a range as follows: ½<Zc/Zw<3.

As foregoing, by appropriately setting the ratios of the work tooth number Zw and the cutter tooth number Zc in accordance with the cases for machining either the internal gear 21 on a work and machining a flexible external gear 22 on a work, desired (required) machining precisions are obtained.

Figure 4:
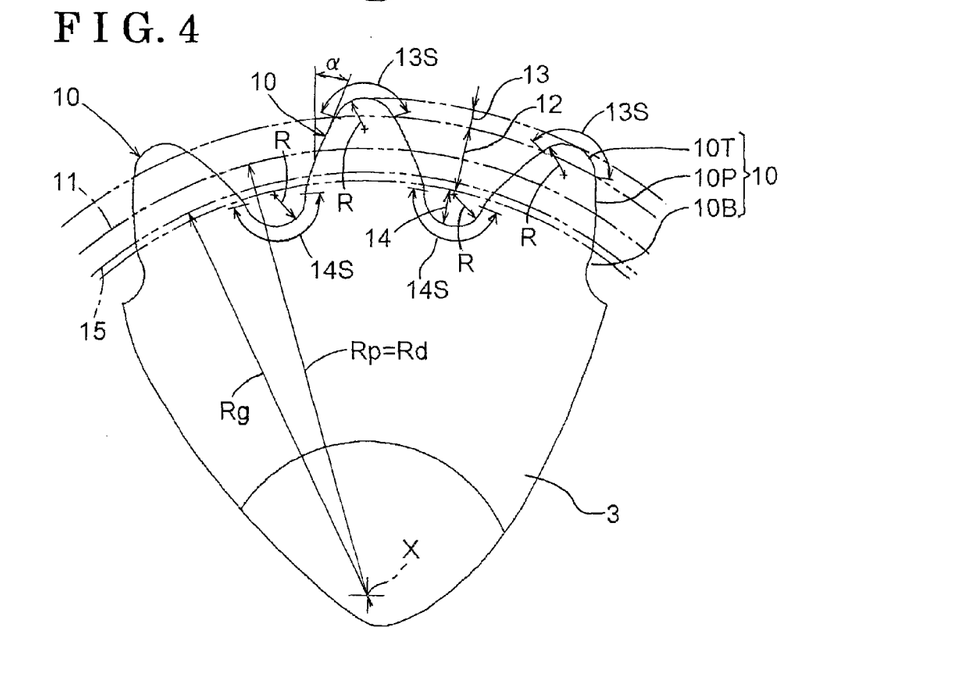
FIG. 4 is a view showing a tooth profile of a cutter according to another embodiment disclosed here.

According to the structure of the cutter 3 of the embodiment, configurations of the tooth surfaces of the addendum region 13 and the dedendum region 14 are formed in configurations different from the involute surface. However, the configurations of the addendum region 13 and the dedendum region 14 are not limited. For example, as shown in FIG. 4, the addendum region 13 may be formed to have an arc surface 13S having a radius R and the dedendum region 14 may be formed to have an arc surface 14S having a radius R. Thus, durability of the cutter 3 may be enhanced by forming the addendum region 13 and the dedendum region 14 in the arc surfaces 13S, 14S.

Constructions of the strain wave gearing device will be explained as follows. FIG. 5 shows the strain wave gearing device which includes the internal gear 21 machined by the gear machining apparatus explained above, the flexible external gear 22 including a reduced number of the teeth than the internal gear 21, an elliptic cam 23, and plural balls 24 arranged being sandwiched between the elliptic cam 23 and the external gear 22. According to the gear machining apparatus explained above, the external gear 22 can be machined and the machining precisions when machining the external gear 22 with the gear machining apparatus is as precise as the case where the internal gear is machined by the gear machining apparatus. The external gear 22 applied to the strain wave gearing device may be machined by the gear machining apparatus.

The tooth number of the internal gear 21 may be determined to be equal to or greater than fifty (50), and may preferably be determined to exceed two hundreds (200).

The strain wave gearing device is configured to engage two teeth among the plural teeth of the external gear 22, which are positioned on an imaginary extended line of a longitudinal shaft of the elliptic cam 23, with the teeth of the internal gear 21. In response to a rotation of a drive shaft 25 connected to the center of the elliptic cam 23, flexed portions of the external gear 22 are rotated to engage particular teeth among the plural teeth of the external gear 22, which are positioned on the imaginary extended line of the longitudinal shaft of the elliptic cam 23, with the teeth of the internal gear 21, thus relatively rotating the internal gear 21 and the external gear 22 in order for a speed reduction. The machining method of the external tooth 22 is not limited to the machining by the gear machining apparatus, and, for example, may be machined by a hobbing machine.

According to the internal gear 21 machined by the gear machining apparatus explained above, the involute surface is formed at the region including the pitch circle 11 in the tooth depth direction, however, the involute region in which the involute surface is formed is short in the tooth depth direction. Thus, according to the foregoing construction, a meshing performance is not favorable when the internal gear is applied to, for example, a ring gear of a sun gear. However, when the internal gear 21 machined by the gear machining apparatus explained above is applied to the strain wave gearing device, a meshing performance of the engagement between the internal gear 21 and the external gear 22 is ensured.

Because the strain wave gearing device is not configured to perform a simple rotational movement and is configured to move the meshing position by relatively displacing the internal gear 21 and the external gear 22 while the external gear is elastically deformed relative to the internal gear in the tooth depth direction in a state where a part of the multiple number of the teeth of the internal gear 21 and a part of the multiple number of the teeth of the external gear 22 are engaged, a transmission structure is different from the construction in which the rotational force is transmitted while maintaining the engaged state of the teeth of the internal gear and the teeth of the external gear. Because of the foregoing reasons, as long as the profile of the internal gear 21 is configured so that the involute surface is formed within the region of the internal gear 21 which comes in contact with the external gear 22 adequate meshing performance is attained, and favorable engaging state is attained even if an area in which the involute surface exists in tie tooth depth direction is reduced compared to other type of normal internal gear.

According to the constructions of the embodiments, the gear machining apparatus disclosed here is suitable for machining the internal gear 21 of the strain wave gearing device. For example, a value of the base circle radius Rg may be increased by increasing a value of the pressure angle $\alpha$ (for example, eleven degrees (11°) to twenty-five degrees(25°)) of the cutter 3 and by increasing the tooth number z of the pinion type cutter 3 in accordance with the tooth number of the internal gear 21, which exceeds two hundred (200). Thus, by increasing the base circle radius Rg of the cutter 3, for example, even when a change in the value of the base circle radius Rg of the cutter 3 is required, variations of the value of the base circle radius Rg relative to that variation is assumed to be small, and a machining with high precision is attained without modifying the tooth profile.

Particularly, when machining the internal gear 21, by cutting the work 1 within the region of the involute surface 10P of the cutter 3, an involute surface is formed on the internal gear 21. In those circumstances, because the region of the involute surface 10P of the cutter 3 is assumed to be about ten percent (10%) minimally in the tooth depth direction, the region of the involute surface at the tooth of the internal gear 21 is assumed to be about ten percent (10%). However, because the strain wave gearing device is configured to move the engaging position while the internal gear 21 and the external gear 22 relatively displace each other in the tooth depth direction by an elastic deformation of the external gear 22 relative to the internal gear 21, the involute surfaces of the respective gears are not necessary to continuously contact each other to transmit the drive force, and thus the engagements with adequate meshing performance is attained. Instead of the involute surfaces formed on the internal gear 21 and the external gear 22 of the strain wave gearing device, a curved surface in which an involute and a curve similar to an involute are combined may be adopted, and a performance may be enhanced by applying the curved surface explained above.

The gear machining apparatus, the cutter and the strain wave gearing device disclosed here is applicable to a gear machining apparatus for machining gears in general.

According to the embodiment, the gear machining apparatus includes the skiving mechanism positioning a work to be machined and a pinion type cutter on axes skewing from each other, the skiving mechanism rotating the work at a predetermined position and feeding the cutter while rotating in a direction of a tooth trace of a gear to be formed at the work synchronously to the rotation of the work for producing the gear from the work. The cutter includes a tooth surface which is formed with an involute region (12) having an involute curve in an area including a pitch circle in a tooth depth direction, an addendum region (13) continuously formed from the invoute region to an addendum, and a dedendum region (14) continuously formed from the involute region to a dedendum, the addendum region and the dedendum region being shaped in a configuration different from the involute region.

When machining a gear by skiving, a change in a tooth surface configuration of a pinion type cutter in response to a change in a value of a radius of a base circle serving as a parameter is not favorable in terms of maintaining high machining precision. In order to solve the foregoing drawback, an involute curve having a small variation of a pressure angle relative to a variation of a radius of a base circle is applied as a tooth surface configuration of the cutter when setting a pressure angle and a value of radius of a base circle for a gear to be produced, machining errors unlikely occur. For example, in a case where a radius of a base circle of the cutter is significantly large relative to a tooth depth, an involute profile obtained by slightly changing a positional specification of the cutter relative to a work does not largely change. Further, because the gears are engaged in a state where the gears are always in contact with each other within an area (region) including a pitch circle, a tooth surface with an involute curve is required to be formed within the area (region) including the pitch circle. In light of the foregoing, according to the embodiments (disclosure), a tooth surface of the cutter configured based on an involute curve is formed as an involute region at a portion including a pitch circle so that a change in a tooth profile which is to be formed on a work is assumed to be small even if a position of the cutter serving as a parameter is changed. Further, by forming portions of the tooth surface positioned at the addendum side and at the dedendum side relative to the involute region in configurations different from the configuration of the involute region, declination of a performance of a gear produced by the machining is restrained while attaining a machining with high precision. Accordingly, the gear machining apparatus is configured to attain machining with high precision while restraining the influence on tooth surface configurations of the cutter even if a machining parameter is changed when machining a gear by skiving.

According to the embodiment, a value obtained by dividing an average radius of the involute region by a radius of a base circle is defined to be greater than one and smaller than one point one.

According to the cutter satisfying the foregoing conditions, a tooth depth is assumed to be adequately short relative to a radius of a base circle of the cutter. Thus, a configuration of the cutter is approximate to a configuration of a rack type cutter, and in consequence a variation of a gear profile to be formed on a work is reduced even if positions of the cutter relative to the work changes to some extent when the cutter actuates.

According to the embodiment, the involute region is determined to be equal to or greater than ten percent and less than eighty-five percent of an entire tooth depth in a tooth depth direction.

According to the disclosure, because the involute region is formed within a relatively small region, which is equal to or greater than ten percent (10%) and less than eighty-five percent (85%) of the entire tooth depth in the direction of the tooth depth, a drawback to decline a performance of a gear engagement of a gear produced by machining is solved.

According to the embodiment, the cutter applied to the gear machining apparatus includes the skiving mechanism positioning the work to be machined and the pinion type cutter on axes skewing from each other, the skiving mechanism rotating the work at a predetermined position and feeding the cutter while rotating in a direction of a tooth trace of a gear to be formed at the work synchronously to the rotation of the work for producing the gear from the work. The cutter includes a tooth surface which is formed with an involute region (12) having an involute curve in an area including a pitch circle in a tooth depth direction, an addendum region (13) continuously formed from the involute region to an addendum, and a dedendum region (14) continuously formed from the involute region to a dedendum, the addendum region and the dedendum region being shaped in a configuration different from the involute region. In a case where a tooth number of a gear to be formed on the work is defined as $Z_w$ and a tooth number of the cutter is defined as $Z_c$, a ratio $Z_c/Z_w$ between the cutter tooth number $Z_c$ and the work tooth number $Z_w$ is set within a range of being greater than $\frac{1}{4}$ and being smaller than $\frac{2}{3}$ when the gear to be formed on the work is an internal gear and a ratio $Z_c/Z_w$ between the cutter tooth number $Z_c$ and the work tooth number $Z_w$ is set within a range of being greater than $\frac{1}{2}$ and being smaller than 3 when the gear to be formed on the work is an external gear.

As foregoing, by appropriately setting a ratio of the work teeth number $Z_w$ and the cutter teeth number $Z_c$ depending on cases when machining the internal gear and when machining the external gear, necessary machining precision is attained.

According to the embodiment, a value obtained by dividing an average radius of an involute region of the cutter by a radius of a base circle is defined to be greater than one and smaller than one point one.

According to the foregoing constructions, the tooth depth is assumed to be adequately short relative to the radius of the base circle. Thus, the cutter includes a configuration similar to a rack type cutter, and a variation of the tooth profile of the gear to be formed on a work is assumed to be small even if a position of the cutter relative to the work is varied to some extent when the cutter is actuated.

According to the embodiment, an involute region of the cutter is determined to be equal to or greater than ten percent and less than eighty-five percent of an entire tooth depth in a tooth depth direction.

According to the foregoing structure, because the involute region is formed within a relatively small region, which is equal to or greater than ten percent (10%) and less than eighty-five percent (85%) of the entire tooth depth in the direction of the tooth depth, a drawback to decline a performance of a gear engagement of a gear produced by machining is solved.

According to the embodiment, the strain wave gearing device includes the internal gear, an external gear having a reduced number of teeth compared to the internal gear, the external gear being flexible, and the internal gear being produced by a gear machining apparatus including a skiving mechanism positioning a work to be machined and a pinion type cutter on axes skewing from each other, the skiving mechanism rotating the work at a predetermined position and feeding the cutter while rotating in a direction of a tooth trace of a gear to be formed at the work synchronously to the rotation of the work for producing the gear from the work, and the cutter including a tooth surface which is formed with an involute region (12) having an involute curve in an area including a pitch circle in a tooth depth direction, an addendum region (13) continuously formed from the involute region to an addendum, and a dedendum region (14) continuously formed from the involute region to a dedendum, the addendum region and the dedendum region being shaped in a configuration different from the involute region. A part of teeth of the internal gear is engaged with a part of teeth of the external gear by flexing the external gear. The internal gear and the external gear relatively rotate by rotating a flexed portion of the external gear.

According to the foregoing construction, when machining the internal gear by the gear machining apparatus including the skiving machining device, the involute region having an involute curve is formed within the region including the pitch circle in the tooth depth direction on the internal gear, and the addendum region and the dedendum region having the tooth surface configuration different from the configuration of the involute region are formed at the addendum side and the dedendum side, respectively. The strain wave gearing device is not configured to perform a simple rotational movement and is configured to move the engaging positions of the internal gear and the external gear by a relative displacement of the internal gear and the external gear while the external gear elastically deforms in the tooth depth direction relative to the internal gear. That is, the strain wave gearing device is different from the construction which transmits the rotational force while maintaining the engagement of the teeth of the internal gear and the external gear. That is, according to gear pairs which transmit the rotational force in a state where the internal gear and the external gear are engaged, a dimension of contact area of the internal gear and the external gear is great compared to that of the strain wave gearing device. According to the foregoing reasons, as long as the tooth surface configuration of the internal gear is formed so that the involute surface is provided in the area (region) of the tooth of the internal gear which contacts the external gear an adequate engaging performance is ensured, and the area (region) of the tooth of the internal gear at which the involute surface is provided can be reduced in the tooth depth direction compared to a normal internal gear. Further, because the number of the teeth of the internal gear applied to the strain wave gearing apparatus is significantly large, the number z of the tooth of the cutter for machining the internal gear is increased. Considering the tooth profile of the cutter, even if values of the module m and the pressure angle α are constant, the diameter Dg of the base circle is assumed to be large value based on the relationship of the formula: Dg=z·m·cosα. Thus, even in a case where the diameter Dg of the base circle is modified, an influence on a variation of the configuration of the involute curve within the involute region can be reduced. Consequently, in a case where a parameter (e.g., diameter Dg of the case circle) is changed for the gear machining apparatus, a machining with high precision is attained without modifying a tooth profile of the cutter. Accordingly, the strain wave gearing apparatus including the internal gear with high precision is attained. According to the constructions of the disclosure in which the skiving is applied to the strain wave gearing device, a life span of the cutter is enhanced by reducing a machining load applied per each tooth of the cutter so that the number of work gears to be machined by the same cutter is increased. Further, because the engaging rate between the cutter and the work gear (i.e., the gear to be formed on the work) is significantly high, fluctuations (pulsation) of the machining movement is reduced to further enhance the machining precision and to enhance the life span of the cutter.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A gear machining apparatus, comprising:
a skiving mechanism positioning a work to be machined and a pinion type cutter on axes skewing from each other, the skiving mechanism rotating the work at a predetermined position and feeding the cutter while rotating in a direction of a tooth trace of a gear to be formed at the work synchronously to the rotation of the work for producing the gear from the work; and
the cutter including a tooth surface which is formed with an involute region having an involute curve in an area including a pitch circle in a tooth depth direction, an addendum region continuously formed from the involute region to an addendum, and a dedendum region continuously formed from the involute region to a dedendum, the addendum region and the dedendum region being shaped in a configuration different from the involute region,
wherein the addendum region is an arc shape which is part of a first circle, the dedendum region is an arc shape which is part of a second circle, and the tooth surface has no point of discontinuity between the involute region, addendum region and dedendum region, and
wherein a value obtained by dividing an average radius of the involute region by a radius of a base circle is defined to be greater than 1 and smaller than 1.1.

2. The gear machining apparatus according to claim 1, wherein the involute region is determined to be equal to or greater than ten percent and less than eighty-five percent of an entire tooth depth in a tooth depth direction.

3. A cutter applied to a gear machining apparatus, comprising:
a skiving mechanism positioning a work to be machined and the pinion type cutter on axes skewing from each other, the skiving mechanism rotating the work at a predetermined position and feeding the cutter while rotating in a direction of a tooth trace of a gear to be formed at the work synchronously to the rotation of the work for producing the gear from the work; and
the cutter including a tooth surface which is formed with an involute region having an involute curve in an area including a pitch circle in a tooth depth direction, an addendum region continuously formed from the involute region to an addendum, and a dedendum region continuously formed from the involute region to a dedendum, the addendum region and the dedendum region being shaped in a configuration different from the involute region,
wherein the addendum region is an arc shape which is part of a first circle, the dedendum region is an arc shape which is part of a second circle, and the tooth surface has no point of discontinuity between the involute region, addendum region and dedendum region,
wherein in a case where a tooth number of a gear to be formed on the work is defined as Zw and a tooth number of the cutter is defined as Zc, a ratio Zc / Zw between the cutter tooth number Zc and the work tooth number Zw is set within a range of being greater than ¼ and being smaller than ⅔ when the gear to be formed on the work is an internal gear and a ratio Zc / Zw between the cutter tooth number Zc and the work tooth number Zw is set within a range of being greater than ½ and being smaller than 3 when the gear to be formed on the work is an external gear, and
wherein a value obtained by dividing an average radius of an involute region of the cutter by a radius of a base circle is defined to be greater than 1 and smaller than 1.1.

4. The cutter according to claim 3, wherein the involute region of the cutter is determined to be equal to or greater than ten percent and less than eighty-five percent of an entire tooth depth in a tooth depth direction.

5. The gear machining apparatus according to claim 1, wherein the involute region of the cutter is minimally 10 percent in a tooth depth direction.

* * * * *